(12) United States Patent
Larsson et al.

(10) Patent No.: US 7,729,260 B2
(45) Date of Patent: Jun. 1, 2010

(54) COST DETERMINATION IN A MULTIHOP NETWORK

(75) Inventors: Peter Larsson, Solna (SE); Niklas Johansson, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 795 days.

(21) Appl. No.: 10/584,131

(22) PCT Filed: Dec. 1, 2004

(86) PCT No.: PCT/EP2004/053191

§ 371 (c)(1),
(2), (4) Date: Jun. 23, 2006

(87) PCT Pub. No.: WO2005/064864

PCT Pub. Date: Jul. 14, 2005

(65) Prior Publication Data

US 2007/0147254 A1 Jun. 28, 2007

(30) Foreign Application Priority Data

Dec. 23, 2003 (SE) .................................... 0303576

(51) Int. Cl.
*H04L 12/26* (2006.01)
(52) U.S. Cl. ...................... 370/238; 370/252
(58) Field of Classification Search .............. 370/236, 370/252, 338; 701/202
See application file for complete search history.

(56) References Cited

U.S. PATENT DOCUMENTS

| 6,363,319 | B1 * | 3/2002 | Hsu ........................... 701/202 |
| 2002/0051425 | A1 | 5/2002 | Larsson | |
| 2003/0202476 | A1 * | 10/2003 | Billhartz et al. .............. 370/236 |
| 2004/0156345 | A1 * | 8/2004 | Steer et al. ................... 370/338 |

FOREIGN PATENT DOCUMENTS

| JP | 2004/507917 | 11/2004 |
| WO | WO 96/19887 | 6/1996 |
| WO | WO 98/56014 | 12/1998 |
| WO | WO 02/17110 | 2/2002 |
| WO | WO 2004/091155 A1 | 10/2004 |

OTHER PUBLICATIONS

Biswas et al., "Opportunistic Routing in Multi-Hop Wireless Networks", Second Workshop on Hot Topics in Networks, 'Online! Nov. 20, 2003, pp. 1-6, XP002319888.*

(Continued)

*Primary Examiner*—Albert T Chou
(74) *Attorney, Agent, or Firm*—Nixon & Vanderhye P.C.

(57) ABSTRACT

In a multihop communications network a cost determination method includes determining a plurality of simultaneously potential or favorable next hop nodes for at least one of the nodes between a source and a destination node pair, whereby a mesh-like path comprising a plurality of simultaneously potential routes or paths is defined between the source and destination node. This mesh-like structure is typically determined in a distributed manner and results from a cost optimization process. The cost optimization should preferably consider stochastic variations that for example are caused by the wireless medium.

16 Claims, 8 Drawing Sheets

OTHER PUBLICATIONS

Biswas et al., *Opportunistic Routing in Multi-Hop Wireless Networks*, Second Workshop on Hot Topics in Networks, 'Online! Nov. 20, 2003, pp. 1-6, XP002319888.

Nguyen et al., *Path Diversity with Forward Error Correction(PDF) System for Packet Switched Networks*, INFOCOM 2003, Twenty-Second Annual Joint Conference of the IEEE Computer and Communications Societies, vol. 1, Mar. 30, 2003, pp. 663-672, XP002319889.

Charles L. Hedrick Rutgers, "Cisco—An Introduction to IGRP",—The State University of New Jersey, Aug. 22, 1991.

Randolph Nelson and Leonard Kleinrock, Fellow,"The Spatial Capacity of a Slotted ALOHA Multihop Packet Radio Network with Capture", IEEE; 1984 IEEE.

Shweta Jain, Yi Lv, Samir R. Das, "Exploiting Path Diversity in the Link Layer in Wireless Ad Hoc Networks", State University of New York at Stony Brook.

Thinh Nguyen and Avideh Zakhor, "Path Diversity with Forward Error Correction (PDF) System for Packet Switched Networks" University of California, Berkeley, CA, 2003 IEEE.

Sanjit Biswas and Robert Morris,"Opportunistic Routing in Multihop Networks", MIT Laboratory for Computer Science.

Translation of Chinese official action, Mar. 13, 2009, in corresponding Chinese Patent Application No. 200480041931.0

Summary of Japanese official action, Feb. 26, 2010, in corresponding Japanese Application No 2006-546147.

Ohta et al., "Applications of Autonomous Decentralized Clustering to Multicast Routing in Ad Hoc Networks", IEICE Technical Report, vol. 203 No. 420,IN 2006-106, Nov. 6, 2003pp. 19-24.

* cited by examiner

COST DETERMINATION IN A MULTIHOP NETWORK

This application is the US national phase of international application PCT/EP2004/053191 filed 1 Dec. 2004, which designated the U.S. and claims priority to SE 0303576-3 filed 23 Dec. 2003, the entire contents of each of which are hereby incorporated by reference.

TECHNICAL FIELD

The present invention relates to multihop communications networks in general, and particularly to a method for cost determination in such networks.

BACKGROUND

When routing is applied in a wireless communications network, such a network is often denoted a multihop network. In a multihop network, nodes or stations out of reach from each other can benefit from intermediate located nodes that can forward their messages from the source node towards the destination node. Traditionally, multihop networks have been associated with so called ad hoc networks, where nodes are mostly mobile and no central coordinating infrastructure exists. However, the idea of multihop networking can also be applied when nodes are fixed and/or a central coordinating infrastructure exists. One such scenario targets rural area Internet access and uses fixed nodes attached to the top of house roofs, lamp posts and so forth.

So called Bellman-Ford and other prior art routing techniques build up and define a multihop tree or route from a source node to a destination node in a communication network. This is performed by means of passing routing cost information through the network to form routing tables based on the cost information. This cost information can include for example, message delays, cumulative power consumption, or hop count. Within the system, each node or station uses its routing table to make independent decisions. Bellman-Ford based routing leads to the existence of a single route for each source-destination node pair. However as topology changes due to mobility, this single route will pass different nodes over time.

There are several other reasons why a topology changes over time in addition to moving nodes. For example, topology changes may occur even without nodes moving; such as variations caused by moving objects on which radio waves reflect or changes in the communication media. These topology changes include, for example, channel variations, traffic pattern changes, and transmit pattern changes and resource allocation changes.

Changes or fluctuations within the system imply that optimal routing can change based on current conditions in the system. In other words, fluctuations of system properties or characteristics over time, can create windows of opportunity that enable signal transmissions to be more successful than at other times and for other conditions. System properties subjected to change can include, for example, path quality, noise, interference, and message traffic load. The prior art routing techniques such as Bellman-Ford, do not recognize these windows of opportunity, because the stations or nodes in the system do not each store relative information.

In contrast, so called opportune routing techniques exploit opportunities that fluctuations in the network provide. In the context of wireless routing in particular, overall system performance degrades when quality of links within the system varies rapidly over time (for example, due to Rayleigh fading). However, opportune routing partially offsets this loss of performance by using the windows or peaks of opportunity that the variations also provide. When opportune routing is employed, there is not a single route for each source-destination node pair. Instead data packets follow a route that is somewhat random, leading from the source node to the destination node. Consequently, when Bellman-Ford is used, consecutive packets will be sent over the same route, whereas when opportune routing is used, consecutive packets can be routed over different paths but in the same general direction. However, also opportune routing protocols are based on an underlying route/cost determination protocol such as Bellman-Ford, as will be appreciated below.

For a source-destination node pair to be able to communicate with one another two functions have to be implemented, namely route determination (including route maintenance) and packet forwarding.

Firstly, in a route/cost determination step, routes must be determined for each source-destination node pair over which data packets will be sent (at least the next hop needs to be determined for each node). An exception is flooding which does not require knowledge about routes. The determined routes need to be disseminated to relevant nodes in all cases except source routing Secondly, in a packet forwarding step, packets that are received at a node need to be forwarded to a next node along the route determined in the route determination step.

Route/Cost Determination

Routes are traditionally determined based on some shortest path criteria, which gives a single shortest path or route with respect to some cost for each source and destination node pair. The overall goal of such a method is generally stated as:

Given a network of nodes connected by links, where each link has a cost associated with it, define the cost of a path between two nodes as the sum of the costs of the links traversed. For each pair of nodes, find the path with the least cost.

The Bellman-Ford algorithm has played a central role in wired networks (e.g. Internet), but also has an important function in wireless multihop systems. The algorithm provides shortest path determination in a distributed and uncoordinated fashion and guarantees convergence within a finite time by merely exchanging information between adjacent neighbors. Equivalent to shortest path one can use the term minimum cost path/route, which emphasizes that the path is a minimum path with respect to some particular cost metric.

Since Bellman-Ford is a good example of a shortest path algorithm, it will be briefly described with reference to FIG. 1A. But first some definitions that will be useful. Let S be the set of all nodes in the network. Let d denote the destination node for which the route determination algorithm determines routes to. Node i is the node under consideration, i.e. which tries to determine how to get to node d. Now, let S' define the set of all nodes which node i is able to communicate with, i.e. so called neighbor nodes. Nodes within the set S' are indexed by j in the range 1 to J. S" is then a trivial set containing the node from the set S' that from i's viewpoint yields the shortest path. Under the assumption that shortest path is calculated in terms of hops, one node is appointed to belong to S". The shortest path goes over $L_1$ to the node in S".

In order to determine the next hop node S" on a packet's minimum path or route towards the destination node d and the cost of reaching the destination node (i.e. the cost of node i, $Cost_{id}$), the algorithm or method has to consider the costs $Cost_{ij}$ to reach the nodes in S', as well as the costs $Cost_{jd}$ from there on onwards to the destination node d.

The basic Bellman-Ford algorithm can then be described as follows:

Initially, $Cost_{id} = \infty$ and $Cost_{dd} = 0$

The costs are then calculated according to $$Cost_{id} = \min_{\forall j \in S'} (Cost_{ij} + Cost_{jd})$$

This provides the following two important outputs $\Rightarrow Cost_{id}$ and $S''$ Hence, one knows were to forward packets as well as the cost for doing so, and this information needs to be distributed to surrounding nodes.

The algorithm in words: A destination node d initiates the shortest path calculation by broadcasting an initial cost (of e.g. 0) to the adjacent nodes which all have infinite cost for the destination node d to start with. Each node then calculates their respective cost and distributes the result to the neighboring nodes. As more cost information is received, new and lower values of cost are calculated and distributed. After some finite time, all nodes have assumed their lowest attainable cost. If multiple routes with the same cost exist, one of the routes is selected for example by random.

As data is later received at a node, it is forwarded over the lowest cost route according to the destination address. An important observation is that there is at most one next hop node for each destination at any time instants.

Examples of possible cost metrics are: number of hops, delay, interference, power consumption, link capacity etc. Note that the metric does not need to be additive, one may use other operations. Furthermore the min operation may be changed to a max operation instead. One example involving those two issues could be to determine the most reliable route as:

$$Reliability_{id} = \max_{\forall j \in S'} (Reliability_{ij} \cdot Reliability_{jd})$$

Packet Forwarding

Traditional packet forwarding based on the Bellman-Ford algorithm is trivial in the sense that there is only one next hop choice.

Other forwarding protocols like Cisco's IGRP [1], Random forward routing [2], Opportune routing [3, 4], Selection Diversity Forwarding [5], and Anycast [6] enables a node to send a received packet to one out of several optional nodes. The forwarding process therefore involves a non-trivial choice to be made amid a set of favorable nodes. Let us here denote those schemes forward decision based routing, FDBR. This is routing in its most adaptive form, i.e. taking an adaptive decision at each forwarding instance.

In IGRP [1], a node forwards packets to any node having a cost at most v times the minimum cost determined by the Bellman-Ford algorithm.

Random forward routing [2] means that packets are sent to a random node in the forward direction based either on cost from Bellman-Ford or position.

Opportune-routing [3, 4] exploits a Bellman-Ford algorithm to acquire a notion of general correct direction of forwarding and adds local and current knowledge of e.g. link quality and node availability in the forwarding selection.

Selection Diversity Forwarding (SDF) [5] postpones the routing decision to after a packet has been multicast to a multitude of candidate relay nodes. Based on responses and informed node status the sending station selects and informs one of the candidate stations or nodes that successfully received earlier packet transmission. The next hop node determination algorithm is orthogonal to the SDF mechanism, but may be based on e.g. the Bellman-Ford algorithm.

Anycast [6] transmits a probe prior to any data transmission and therefore near identical operation to the basic SDF will be experienced. In addition, Anycast is similar to a variant of SDF.

Note that there is a distinct difference between this somewhat multipath oriented routing scheme and classical multipath routing. In the latter case, multiple and parallel routes are defined for source destination node pairs, where the forwarding choice is merely performed at the source, i.e. disjoint multipath routing. As packets are led into one of the multiple routes, they then follow their chosen route and hence the forwarding decision is trivial as in the classical Bellman-Ford case.

In addition to route determination and packet forwarding, an optional function is to incorporate topology control that aims to provide suitable connectivity in the network. This enhances performance and saves resources. Topology control typically includes power control and link adaptation.

SUMMARY

A careful analysis reveals that one of the problems with so called Forward Decision Based Routing (FDBR) protocols is that they rely on a route/cost determination mechanism, e.g. Bellman-Ford, which does not reflect their forward decision oriented operation. In addition, other wireless routing schemes with trivial forwarding decisions could also make use of a better alternative than the Bellman-Ford algorithm.

Consequently, an object is to provide an improved route determination mechanism.

Another object is to provide a cost or route determination mechanism that reflects forward decision oriented operation.

A further object is to provide a cost or route determination mechanism that is tailored for a broadcast medium (which radio inherently is), and tailored for a fast varying channel quality as the radio inherently provide.

Another object is to provide a cost or route determination mechanism that is tailored to support forward decision based routing.

Yet, another object is to provide a cost or route determination mechanism that is tailored to account for the way in which nodes are connected for each source-destination pair.

Another object is to provide a cost or route determination method that is tailored to integrate forward decision oriented topology control.

An additional object is to provide a cost or route determination method that does not react violently at link changes/failures.

Specifically, a method is provided for cost determination that determines a plurality of simultaneously potential or favorable next hop nodes for at least one of the nodes between each source and a destination node pair, whereby a mesh-like path comprising a plurality of simultaneously potential routes or paths is defined between the source and destination node. This mesh-like structure is typically determined in a distributed manner and results from a cost optimization process. The cost optimization should preferably consider stochastic variations that for example are caused by the wireless medium. In particular, considerations to FDBR-schemes can be given.

A cost optimization method is provided that determines a plurality of simultaneously potential next hop nodes that jointly optimizes a predetermined cost function for at least one node between a source and a destination node, thereby also determining an optimal cost for the considered node.

Also provided are a system and a node that enable the above-mentioned method.

These and other objects are achieved in accordance with the attached claims.

This technology offers the following example advantages:
provides robustness under node failure, varying node availability, and node mobility,
provides robustness under varying channel quality due to fading and interference,
integrate diversity aspects as a natural part,
cater for redundant paths and ensure that traffic is preferably forwarded where the most advantageous connectivity exists,
supports multipath routing,

DETAILED DESCRIPTION

The technology in the following be described in the context of a wireless multihop communications network. It is however implied that the technology is equally applicable to conventional wireline networks.

Basically, as stated before, an example embodiment determines a plurality of simultaneously potential or favorable next hop nodes for at least one node between a source and a destination node in a communications network. This is preferably performed by a cost optimization procedure. By doing so, a mesh-like structure of simultaneously potential routes is determined between the source and destination node.

Figure 1A:
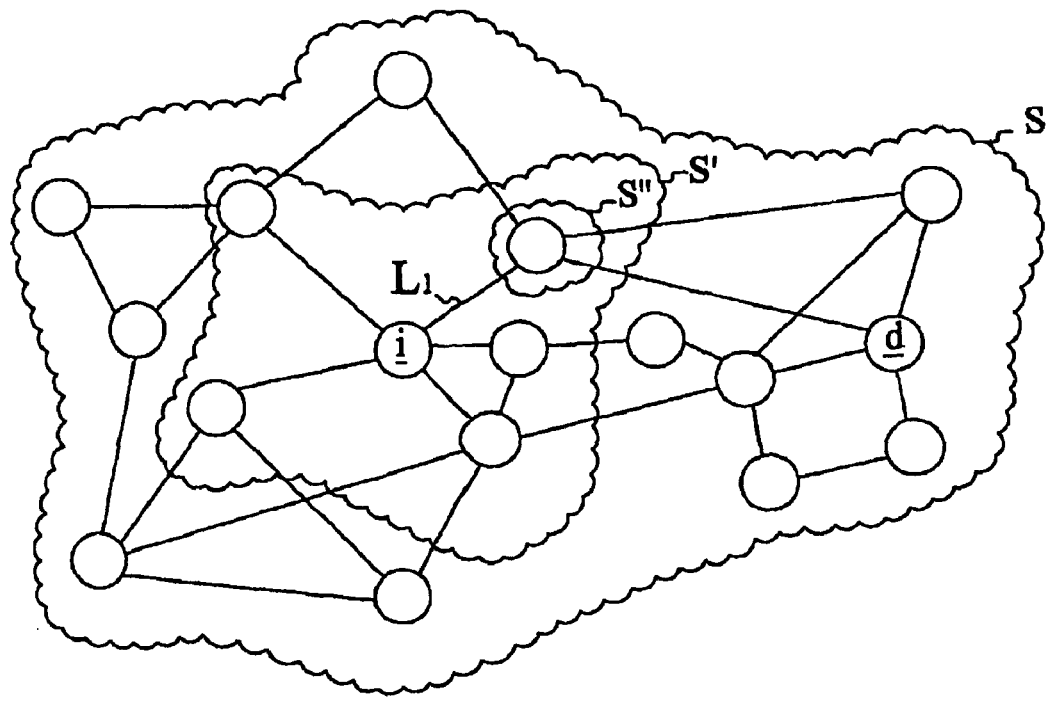
FIG. 1A is a schematic overview of a multihop network.
Figure 1B:
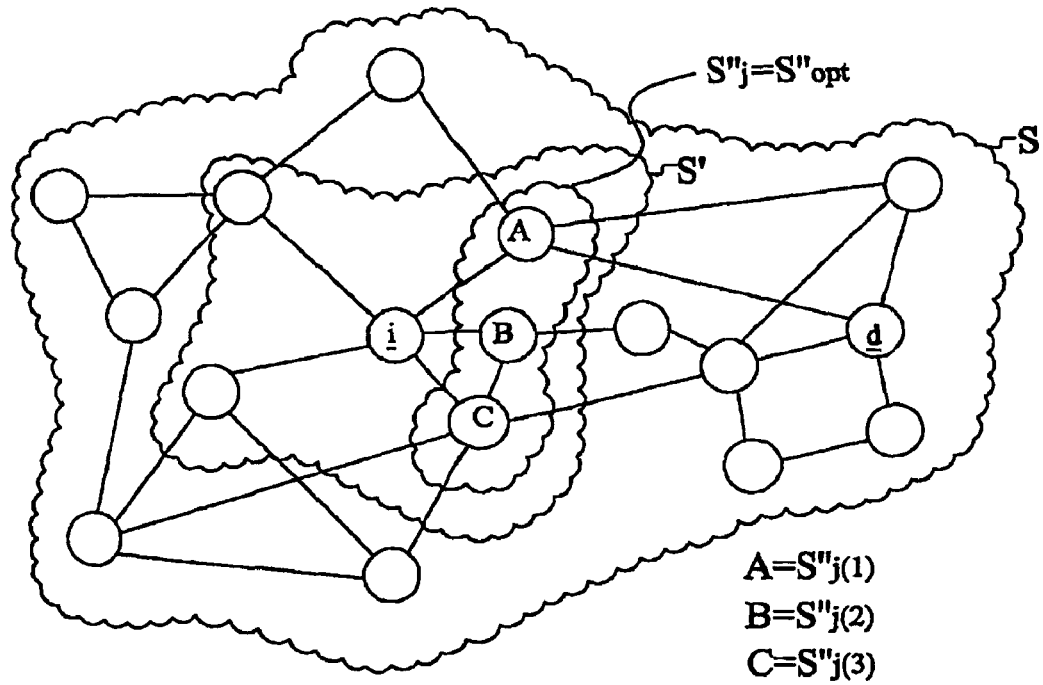
FIG. 1B is a schematic overview of an example embodiment of a multihop network.

Before the method can be further discussed, a number of definitions will be presented, with reference to FIG. 1B.

Similarly to the earlier described Belhnan-Ford algorithm, S defines the set of all nodes in the network. The subset S' defines the set of all nodes within the union of transmission and reception range or so called neighbors of the node i. Also referred to as bi-directional connectivity, where connectivity is defined as the ability to send data with a power lower than a specified threshold when transmission parameters are optimized e.g. full transmit power and no interference exists. Node i is the node, also sometimes referred to as terminal or station under consideration for which a cost is to be determined, i.e. the set S' comprises the neighbors of node i.

The set S" is the power set over S, i.e. S" includes all possible combinations of the nodes in S'. However, the empty set is not considered. The various combinations are indexed with j where $j \in [1, 2, 3 \ldots, 2^N-1]$ when S' contains N nodes. Each set $S''_j$ includes one or more nodes where the nodes are indexed by k, i.e. $S''_{j(k)}$.

FIG. 1B shows S, S' and one of all $S''_j$:s in S". As S' contains 5 nodes, there are 31 different sets in S". The shown $S''_j$, which also happens to be the optimal set S" (opt) has 3 nodes, indexed $S_{j(1)}''$, \ldots $S_{j(3)}''$. S" (opt) is the set of nodes which together or jointly provides the optimum $Cost_i$.

Figure 2A:
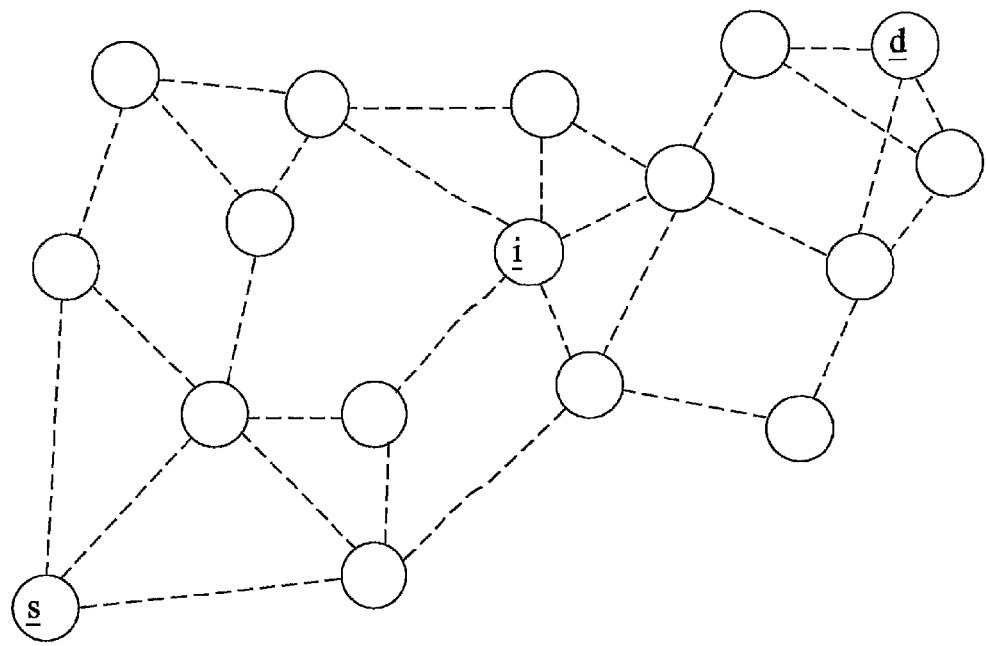
FIG. 2A is a schematic overview of a multihop network.

FIG. 2A shows a network comprising a plurality of nodes where potential links are indicated by dashed lines between nodes. Also, a source node s, a destination node d and an intermediated node i that is the node under consideration are indicated.

In order to determine the plurality of simultaneously potential next hop nodes or set of favorable next hop nodes, it is desirable to optimize a cost function $f_1$ for node i, preferably according to:

$$\underset{S''_j \in S''}{Optimize} f_1\left(Cost_{S''_{j(k)}}, \Delta Cost_{i, S''_{j(k)}} \mid \forall S''_{j(k)} \in S''_j\right) \Rightarrow Cost_i(opt), S''_j(opt)$$

where Optimize represents an arbitrary optimization operation depending on choice and design goal. The term $Cost_{S''_{j(k)}}$ represents the individual costs of node $S''_{j(k)}$ in one particular set $S''_j$, whereas $\Delta Cost_{i, s''_{j(k)}}$ represents the cost of going from node i to node $S''_{j(k)}$. Furthermore, the function combines the costs given by each node $S''_{j(k)}$ in $S''_j$.

In doing so the function also can optionally invoke any prioritization rule employed by the MAC protocol, which may e.g. always be that the node with the lowest cost is selected if data is received correctly by multiple nodes in $S''_j$.

An optional exemplary manner in which to perform such optimization, where topology is taken into account is according to the following expression:

$$\underset{S''_j \in S''}{Optimize} \left(f_1\left(Cost_{S''_{j(k)}}, \Delta Cost_{i, S''_{j(k)}} \mid \forall S''_{j(k)} \in S''_j\right) \circ Const_i \Rightarrow Cost_i, S''_j(opt),$$

where the ° sign represents an arbitrary arithmetic operation depending on choice and design goal. The cost term $Const_i$ is a constant which node i may include in the overall cost. Its purpose could be to manage the topology connectivity and dynamic properties somewhat. It could also reflect interference or the queuing situation at node i.

As the wireless communication quality in general is somewhat unpredictable, a stochastic modeling is suitable. As a consequence, the cost determination deals in some extent with optimizing expectancy values. This is a sensible approach as this is in line with traditional treatment of lower layers performance optimization.

Figure 2B:
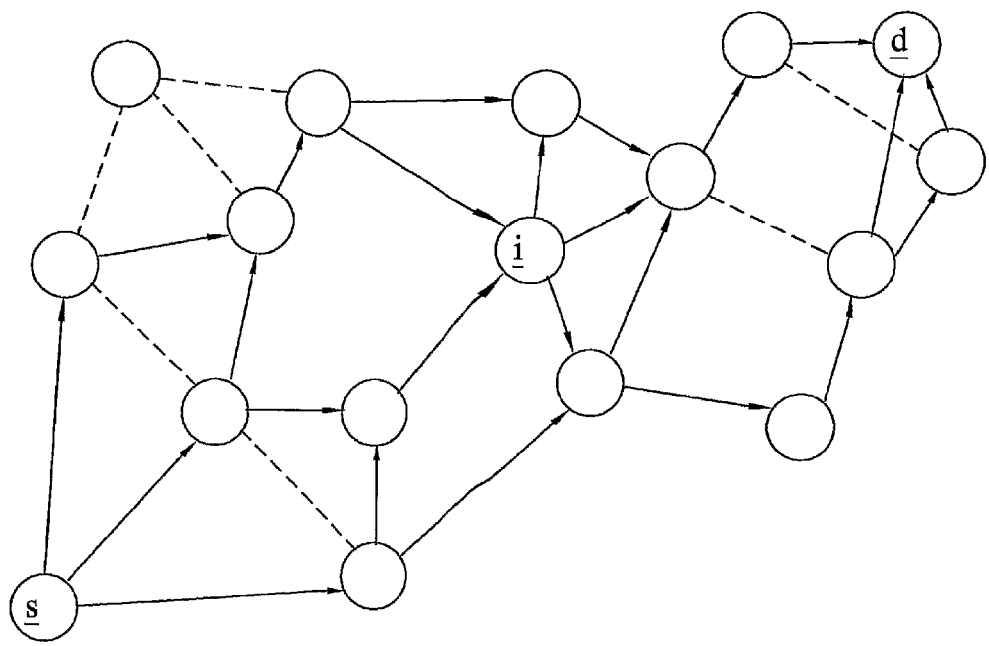
FIG. 2B is schematic overview of a multihop network with routes determined according to an example embodiment.

The above described method is repeated node by node until all nodes have attained a minimum or optimal cost. This does not mean that all nodes have a plurality of favorable next hop nodes, some nodes might have only one next hop node. But, as stated earlier, at least one node has a plurality of favorable next hop nodes associated with it. Thereby, a plurality of simultaneously potential routes or paths is provided, as is shown in FIG. 2B.

An optional amendment to the above described embodiment is to also determine appropriate link parameters. This is facilitated by the following:

$$\underset{S''_j \in S''}{Optimize} \left\{ \underset{Par}{Optimize} \left\{ Cost_{i,S''_j}(Par) \circ f_2\left(\Delta Cost_{S''_{j(k)}} \,\middle|\, \forall\, S''_{j(k)} \in S''_j\right) \right\} \circ Const_i \right\} \Rightarrow$$

$$Cost_i, S''(opt), Par(opt)$$

Here, the term Par denotes an n-dimensional link parameter space (n=1, 2 . . . ) comprising both continuous and discrete parameters. The $Cost_{i,S''_j}(Par)$ term represents the cost (or effort) to send data packets from a node i to any, or alternatively a predetermined number, of nodes in the set $S''_j$. The predetermined number is typically set to one node in a practical system. Moreover, the $Cost_{i,S''_j}(Par)$ term is a function of the link parameter space Par and the set of nodes, i.e. $S''_j$, under consideration.

The term link parameters is a collective term for call parameters such as modulation, coding and spreading scheme, transmit power, antenna weights and frequency channel parameters. Link parameters thus include DLC (Data Link Control) parameters on the data link layer as well as underlying physical PHY layer parameters. The DLC parameters include both LLC (Logical Link Control) parameters and MAC (Medium Access Control) parameters, and hence a link parameter may be selected from LLC, MAC and PHY parameters.

With the above discussed amendment the example embodiment will output $Cost_i$, S" (opt), Par (opt), i.e., the cost seen from node i to the destination node, the set of simultaneously potential or favorable next hop nodes over which data can be forwarded, and the optimum link parameters to use when forwarding data.

Figure 3A:
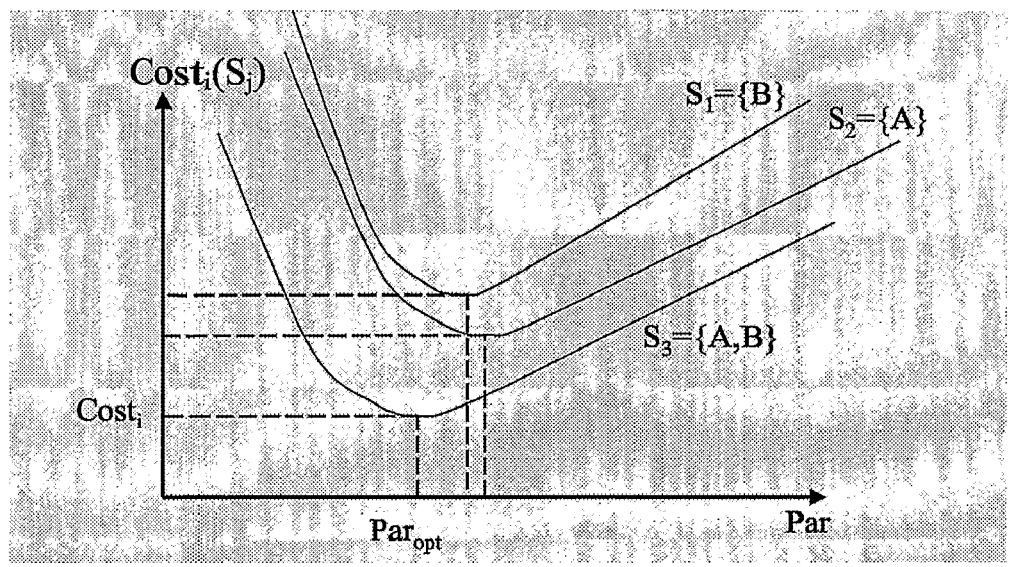
FIG. 3A is a diagram according to an exemplification of an example embodiment.

An exemplification of how an example embodiment operates is shown in FIG. 3A. In this diagram the cost for a node i is plotted as a function of some link parameter Par. It is assumed that the node i sees two nodes, A and B, each with an associated cost $Cost_A$ and $Cost_B$. Out of these two nodes, three power sets can be constructed according to the embodiment of the method according to the invention i.e. $S''_1$, $S''_2$ and $S''_3$. Out of the three sets, $S''_3$ is the most optimal here, i.e. S"(opt)=$S_3$". In other words, $S_3$" minimizes the cost for node i. Thereby two simultaneously potential or favorable next hops are determined for the node.

Figure 3B:
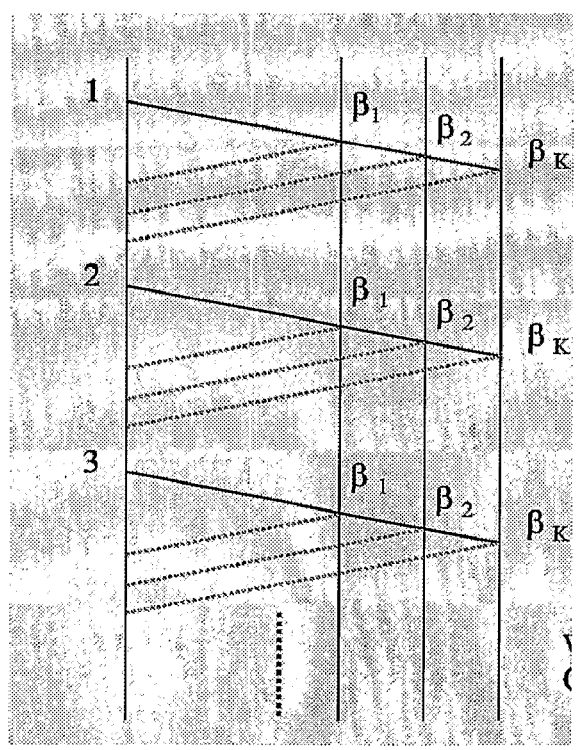
FIG. 3B is a diagram of another exemplification of an example embodiment.

Another exemplary application is given with reference to FIG. 3B, when utilized in a forwarding procedure.

In the example, the cost metric is heuristically chosen to be the expected least delay. This ought to be a sensible metric as the forward progress is then maximized.

The delay in node i is determined by the number of retransmissions and the transmit probability $P_{TX}$ (i.e. the probability of transmission in a slot). The number of (re)transmissions $\bar{t}_i$ by node i depends on the characteristics of the channel between node i and nodes in $S''_{opt}$, as well as modulation, Automatic Repeat Request (ARQ) and coding scheme.

To illustrate this, consider a selective repeat ARQ, and deterministic path loss L. The dectector characteristic is represented by $\beta_k$, the unconditional probability of reception by node $S''_{j(k)}$, $\beta_k = f(P_{TX}$, modulation,FEC, $N_0$, $L_k)$ and is a function of many parameters.

| Number of transmissions | Probability of success | Average number of retransmissions |
|---|---|---|
| 1 | $P_1 = 1 \cdot (1 - C)$ | $P_1 \cdot 1$ |
| 2 | $P_2 = C \cdot (1 - C)$ | $P_2 \cdot 2$ |
| 3 | $P_3 = C^2 \cdot (1 - C)$ | $P_3 \cdot 3$ |

$$\bar{t}_i = \sum_{n=1}^{\infty} n \cdot C^{n-1} \cdot (1-C) = \frac{(1-C)}{C} \cdot \sum_{n=1}^{\infty} n \cdot C^n =$$

$$\frac{(1-C)}{C} \cdot \frac{C}{(1-C)^2} = (1-C)^{-1},$$

Where $$C = \prod_{k=1}^{K} (1 - \beta_k)$$

and the expected value for the delay in number of slots in node i is then:

$$E[Delay_i] = \frac{1}{P_{TX}} \cdot \frac{1}{1-C}$$

An additional and sensible rule is that provided that several nodes in $S''_{opt}$ receive data at the same time; the one with the lowest cost is selected first for forwarding data. Such selection is straightforward to implement in SDF [5], but any other selection rule based on e.g. queue length, random or round robin is also possible.

For the selection purpose here, the nodes in $S''_{opt}$ are indexed such that the costs $C_k$ have the property $$C_1 \leq C_2 \leq \ldots \leq C_K$$

where K index the last node in the set. These costs should be weighted with the conditional reception probabilities $\gamma_k$, i.e. conditioned that any of the nodes have received the data:

$$\gamma_k = \frac{\beta_k}{1 - \prod_{h=1\ldots K} (1 - \beta_h)}$$

The combined cost function $f_1$ is then:

$$f_1\left(Cost_{S''_{j(k)}}, \Delta Cost_{i, S''_{j(k)}} \,\middle|\, \forall\, S''_{j(k)} \in S''_j\right) =$$

$$\frac{1}{\bar{t}_i} + \frac{\begin{pmatrix}\gamma_1 \cdot C_1 + \gamma_2 \cdot (1-\gamma_1) \cdot C_2 + \ldots + \\ \gamma_K \cdot (1-\gamma_{K-11}) \cdot \ldots \cdot (1-\gamma_1) \cdot C_K\end{pmatrix}}{(\gamma_1 + \gamma_2 \cdot (1-\gamma_1) + \ldots + \gamma_K \cdot (1-\gamma_{K-11}) \cdot \ldots \cdot (1-\gamma_1))}$$

The particular weighting here is supposed to reflect the selection rule that the lowest cost node is selected if it has received data, and if not, the next lowest cost node is selected and so on.

A similar approach can be taken for fading channels, though the analytical mathematical expression will be more complicated.

Rather than using an analytical expression one may use a simulation approach. Two cases are envisioned, one may use look up tables from pre-simulated cases or one may use a simulation in real-time with current parameters as inputs. The latter is perhaps not the most practical solution but still an option.

Rate Dependent Mesh Metric

Yet another mesh metric can be envisioned if one assumes that different rates may be employed for communication. Since the path loss differs between different nodes, and different nodes are differently affected by interference, and transmitting nodes may invest different amount of transmit power, the signal to interference ratio can also differ significantly at reception for different nodes. A fundamental aspect of communication is that the maximum rate a node can receive a packet at, is a function of signal to interference ratio (or just signal to noise ratio, i.e. if no interference exist). The higher signal to interference ratio, the higher data rate can be supported, Hence, it is of interest to consider a mesh metric based on the assumption that nodes can use different rates for transmission (as well as reception). Different rates are made possible by coding a packet with different forward error correction codes, different spreading factors, and different modulation alphabets (e.g. compare 4 QAM and 64 QAM signal constellation).

Now the rate dependent metric is formalized. The scenario that is considered is to minimize the average end-to-end time resource utilization, constrained that a transmission will occur after indicating transmission with a probe. This situation arises in a multihop forwarding scheme such as MDF [7] that first sends a short probe to multiple nodes, receives multiple responses indicating the rate that can be used to each user, and subsequently select a packet to be transmitted to a selected user. Here, the aspect of flow selection, i.e. is part of MDF, is neglected. (Since a transmission has been indicated by a probe, and other nodes may have adapted their rate selection in accordance to the experienced interference, it makes no sense to postpone the transmission to a later stage)

Now consider a node i that considers a set of K nodes that is a set in the superset of all neighbor nodes. Now, the nodes are ordered (and enumerated) such that $$C'_1 \leq C'_2 \leq \ldots \leq C'_K.$$

where $C'_k = \Delta C_{ik} + C_k$, $k \in \{0, \ldots, K\}$, and $\Delta C_{ik}$ is the average cost from node i to node k, and $C_k$ is the cost at node k towards the considered destination (in practice this is done for all destinations, but here only one destination is examined). Now the rate dependency is introduced by setting $$\Delta C_{ik} = \frac{1}{r_{ik}},$$

where $r_{ik}$ is the rate between node i and node k. The rate can be determined through various ways, either estimated from previous communication, but also more directly determined from knowledge of the path gain $G_{ik}$, transmit power $P_i^{(TX)}$ intended to be used by node i, and the noise plus interference level $W_k$ at the node k. E.g. the Shannon bound may be used for determining the rate $r_{ik} = \lg_2(1 + G_{ik} P_i^{(TX)}/W_k)$.

Then the combined mesh cost $f_1$ can be written $$f_1\left(Cost_{S''_{j(k)}}, \Delta Cost_{i, S''_{j(k)}} \mid \forall S''_{j(k)} \in S''_j\right) =$$

$$\frac{\begin{pmatrix} \gamma_1 \cdot C'_1 + \gamma_2 \cdot (1-\gamma_1) \cdot C'_2 + \ldots + \\ \gamma_K \cdot (1-\gamma_{K-11}) \cdot \ldots \cdot (1-\gamma_1) \cdot C'_K \end{pmatrix}}{(\gamma_1 + \gamma_2 \cdot (1-\gamma_1) + \ldots + \gamma_K \cdot (1-\gamma_{K-11}) \cdot \ldots \cdot (1-\gamma_1))}$$

where the conditional reception probabilities are used, i.e.

$$\gamma_k = \frac{\beta_k}{1 - \prod_{h=1 \ldots K}(1-\beta_h)}$$

Then, $\beta_k$ is the unconditional probability that node k is available for reception, which is tested by the probing process for MDF [7], described above. The reason why a node may not always be available for reception is that it may not always be receiving, e.g. due to being in transmission mode or in sleep mode.

Since we are interested of minimizing the time resource utilization, the function $f_1(Cost_{S''_{j(k)}}, \Delta Cost_{i,S''_{j(k)}} | \forall S''_{j(k)} \in S''_j)$ is minimized over all possible sets in the superset.

Figure 4:
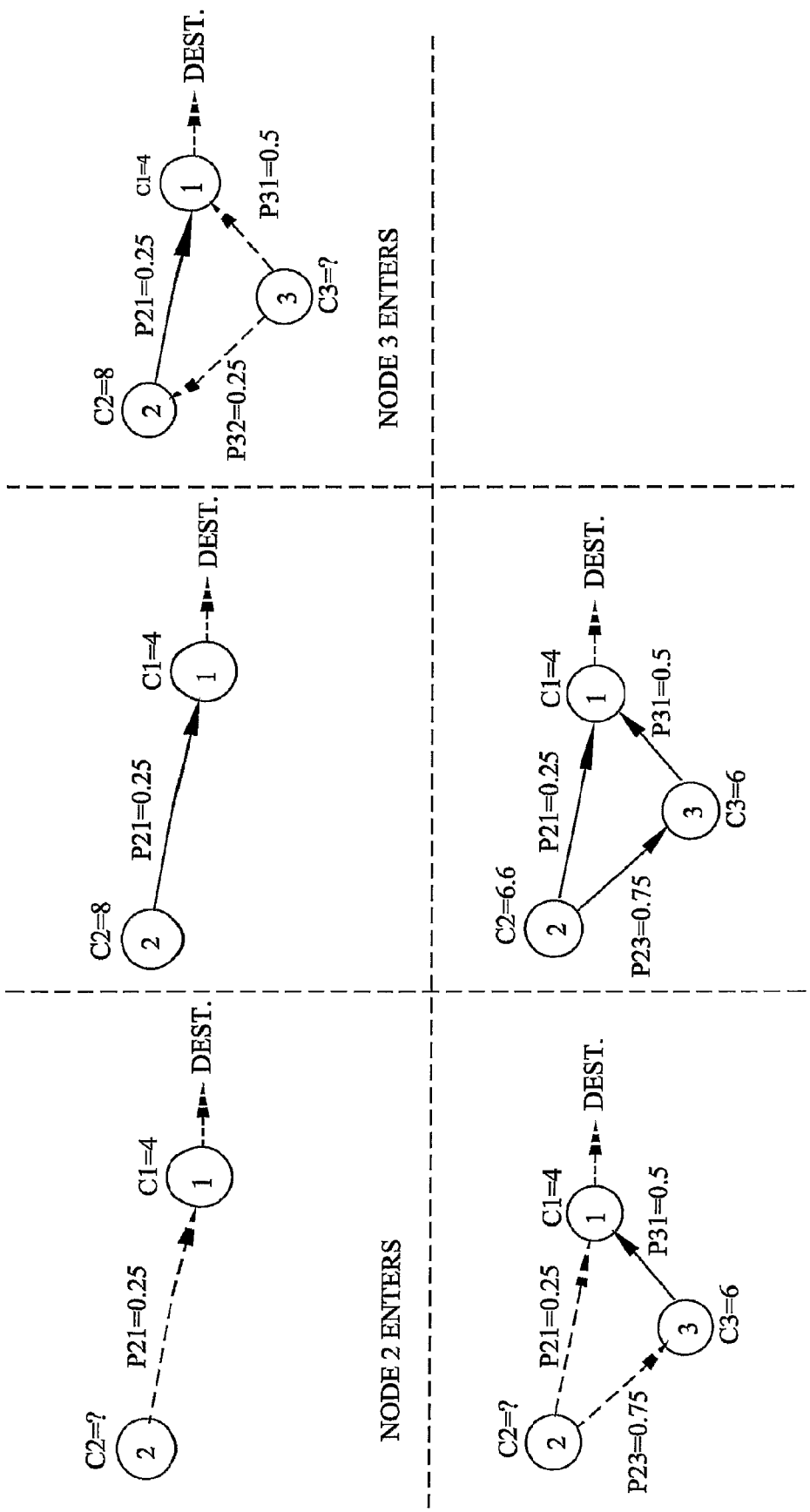
FIG. 4 is a schematic diagram showing the progress of an example embodiment of,
FIG. 5 is a diagram of another exemplification of an example embodiment.

Another exemplification of an example embodiment is given below with reference to FIG. 4.

In this very simplified example each link is characterized by an average reception success probability that is arbitrarily set.

Initially, at some time T1 two nodes 1 and 2 establish contact and node 1 transmits its initial cost C1 to node 2. Consequently, at a time T2 the cost for node 2 is determined to be 8, by means of:

$$C_2 = \frac{1}{0.25} + 4 = 8$$

At some later time T3 a third node, node 3, is added to the network.

At time T4, node 3 determines that connecting to node 1 provides the lowest cost, i.e. 6, by means of:

$$C_3 = \frac{1 + (4 \cdot 0.5 + 0.25 \cdot (1-0.5) \cdot 8)}{1 - (1-0.25) \cdot (1-0.5)} = 6.4 \quad\quad 1 \& 2$$

$$C_3 = \frac{1}{0.5} + 4 = 6 \quad\quad 1$$

$$C_3 = \frac{1}{0.25} + 8 = 12 \quad\quad 2$$

At time T5, node 2 notices the entrance of node 3 and evaluates its cost options. It is determined that the lowest cost is 6.6 when node 2 attaches to both node 1 and node 3, by means of:

$$C_2 = \frac{1 + (4 \cdot 0.25 + 0.75 \cdot (1-0.25) \cdot 6)}{1 - (1-0.25) \cdot (1-0.75)} = 6.6 \quad\quad 1 \& 3$$

$$C_2 = \frac{1}{0.25} + 4 = 8 \quad\quad 1$$

$$C_2 = \frac{1}{0.75} + 6 = 7.3 \quad\quad 3$$

Thereby, according to an example embodiment, two simultaneously potential or favorable next hops and likewise two simultaneously potential paths or routes are provided from node 2, instead of one singular hop or path that would have been the case for the earlier discussed Bellman-Ford.

As indicated earlier, the costs used in calculating the cost at node i are expectancy values, but they could also be considered as stochastic variables modeled by some probability density function (PDF). It is sensible that if the inputs are PDF values, the output is a PDF value. The optimization must however operate on the mean or variance.

As searching among the node sets is a Non-Polynomial (NP) complete problem, this looks frightening to start with. However, the ($2^N-1$) different sets are not a problem if N is small. A golden rule for multihop networks is that a node should have about 6 neighbors, i.e. roughly 3 in the projected forward direction. From this, one gets roughly 7 sets to consider at the cost determination.

A first optional method to reduce the complexity is given by observing that all nodes with a cost higher than the $Cost_i$ for an arbitrary (but perhaps cleverly guessed) set $S''_j$ can be excluded as they do not improve the cost even if they would be considered.

Figure 5:
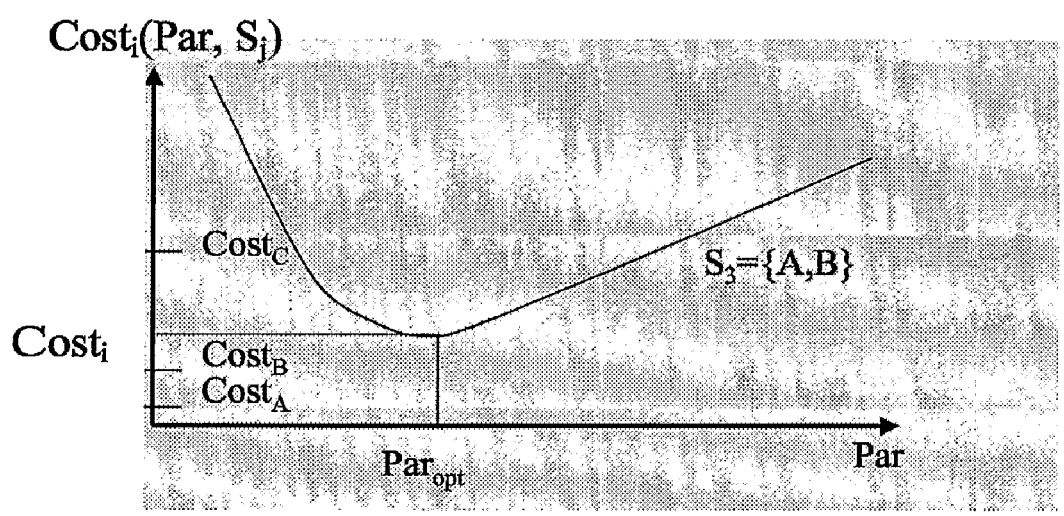

This is exemplified in FIG. 5 that shows the curve of FIG. 3A without the two upper curves. It is noticed that the costs due to nodes A and B are smaller than $Cost_i$ whereas a third node C does not have to be considered, as its cost is greater than $Cost_i$ to start with. Note that this assumes non-negative costs under the addition operator and cost increases by more than one under the multiplication operator.

An optional complementary method for reducing the complexity of the method will be described with reference to FIGS. 6A, 6B and 7. From an algorithmic point of view, it is sensible to start to consider the lowest cost nodes in S' for the first sets $S''_j$ as one can exclude the higher cost nodes quickly.

Figure 6A:
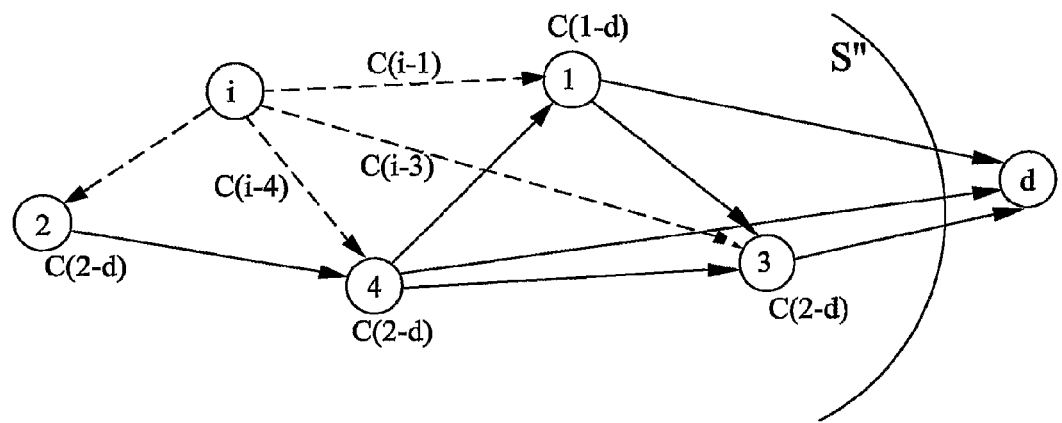
FIG. 6A is an example of a simplified network.

In FIG. 6A, a multihop network with a plurality of nodes is illustrated, each with an associated individual cost. A node i has been inserted and, as shown in the figure, has four neighbors 1, 2, 3 and 4.

Figure 7:
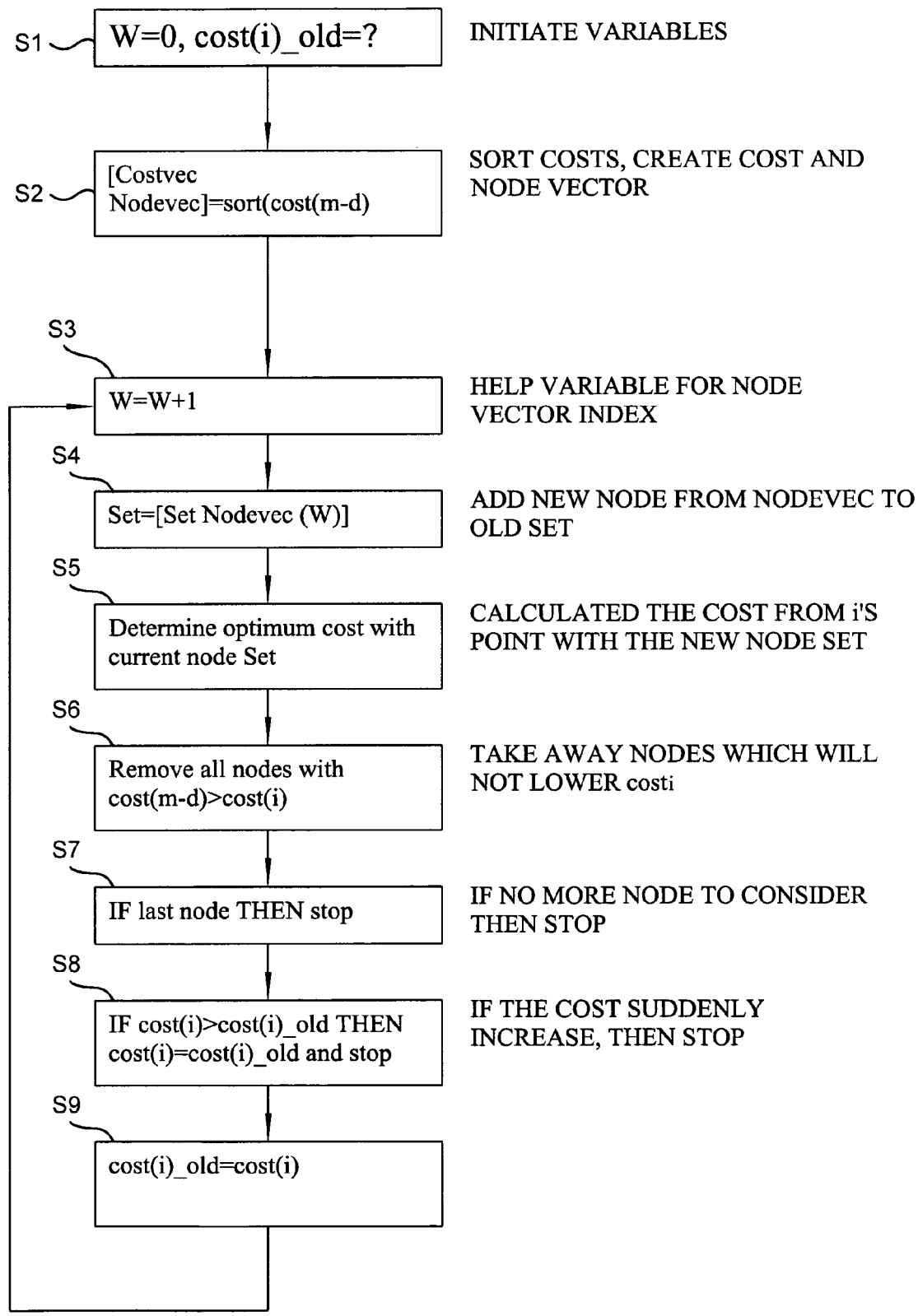
FIG. 7 is flow diagram of an example embodiment.

In FIG. 7 a flow diagram of an example embodiment of an algorithm for reducing the complexity is illustrated. In this heuristic algorithm, costs to the neighbors are in an initial step (not shown) calculated in a Bellman-Ford like manner for all nodes in S". Rather than selecting the optimum cost and next hop node, the nodes are sorted in steps S2-S10 according to the calculated cost. In the same step S2 a cost vector and a node vector are determined. As an example, according to FIG. 6A, the resulting cost vector and node vector may be $\{C_{i-4-d}, C_{i-1-d}, C_{i-3-d}, C_{i-2-d}\}$ and $\{4,1,3,2\}$ where e.g. $C_{i-4-d}$ is the optimum cost for the path from node i to node 4 to the destination node d. $C_{i-4-d}$ is a finction of the cost from node i to node 4, $C_{i-4}$, and the cost from node 4 to the destination $C_{4-d}$.

The sets which are investigated are then $S_1''=\{C_{i-4-d}\}$, $S_2''=\{C_{i-4-d}, C_{i-1-d}\}$, $S_3''=\{C_{i-4-d}, C_{i-1-d}, C_{i-3-d}\}$ up to the last set having a node with an individual cost not exceeding any of the previously determined costs from the view point of node i.

The complexity of the sorting is at most $O(N^2)$ but some algorithms like the divide and conquer based quick sort guarantees a complexity of $O(N \cdot \log(N))$ on average.

The cost determination has complexity $O(N)$, but will have a lower average complexity as impossible nodes are excluded.

Note that the algorithm is heuristic as it does not go through every set combination. However nodes are arranged in the most likely order.

Figure 6B:
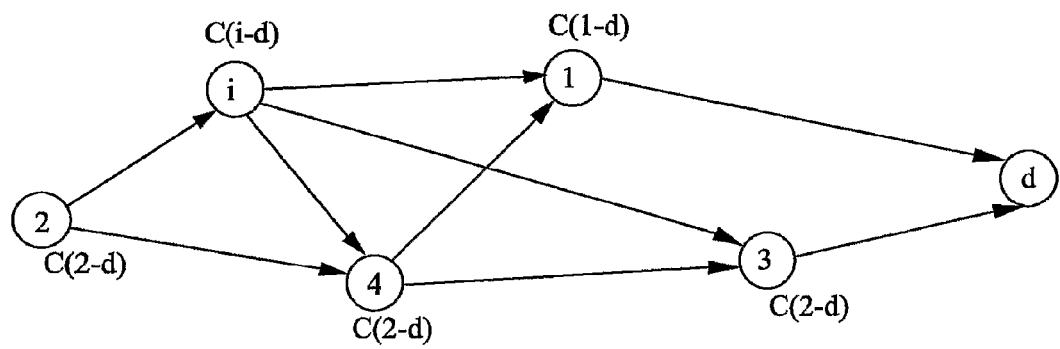
FIG. 6B shows the network from FIG. 6A after an example embodiment.

When each node has updated its respective costs and sets of next hop nodes, the result may look like in FIG. 6B.

Figure 8:
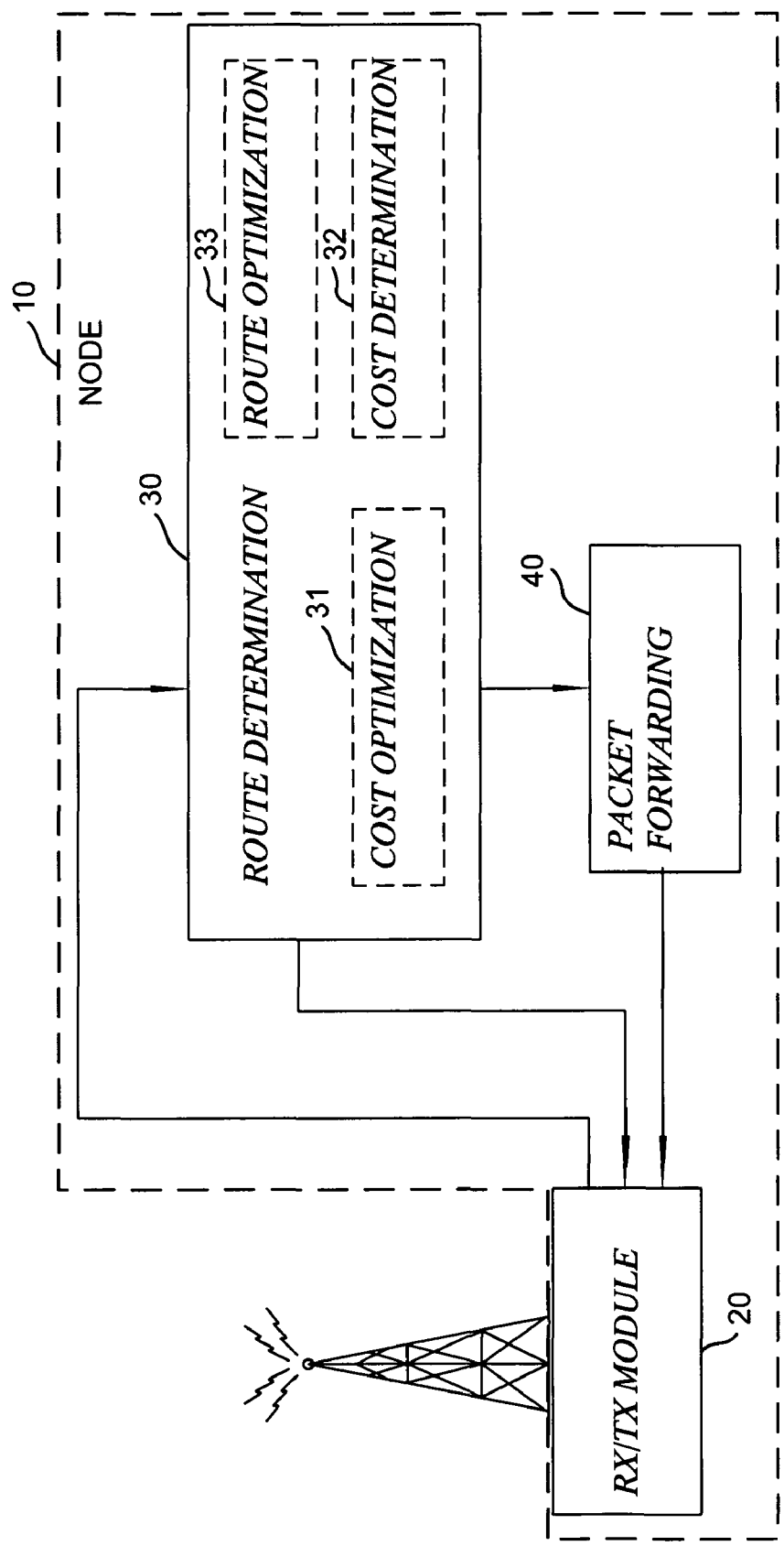
FIG. 8 is a block diagram of an example embodiment of a system.

In FIG. 8 a schematic block diagram of an example embodiment of a node 10 in a multihop communication network is shown. The node 10 comprises a radio transceiver module (RX/TX module) 20 that supplies the necessary receiving and transmission functionalities in a known manner. The node 10 also comprises route determination means 30 adapted for determining routes between a source and destination node. The route determination 30 means in turn comprises means for cost optimization 31, cost determination 32 and means 33 for route optimization. Finally, the node 10 comprises means for packet forwarding 40 based on an output from the means for route determination 30.

It will be understood by those skilled in the art that various modifications and changes may be made. The scope of the invention is defined by the appended claims.

REFERENCES

[1] C. L. Hedrick Rutgers, "Cisco-An introduction to IGPR", 22 Aug., 1991, htttp://www.cisco.com/warp/public/103/5.html
[2] R. Nelson, L. Kleinrock, "The spatial capacity of a slotted ALOHA multihop packet radio network with capture", *IEEE Transactions on Communications*, 32, 6, pp 684-694, 1984
[3] WO 96/19887
[4] WO 98/56140
[5] US 2002/0051425
[6] S. Jain, Y Lv, S. R. Das, "Exploiting Path Diversity in the Link Layer in Wireless Ad Hoc Networks", Technical Report, WINGS Lab, July 2003
[7] WO2004/091155

The invention claimed is:

1. A method for cost determination independent of data packet forwarding in a multihop communications network, comprising the steps of:
   a computer-controlled node in the multi-hop communications network determining a plurality of simultaneously potential next hop nodes for at least one of multiple nodes from a source node to a destination node in the network, such that said simultaneously potential nodes jointly optimize a predetermined cost function based on a weighted combination of individual costs for each possible next hop node for said at least one of multiple nodes, said plurality of simultaneously potential next hop nodes forming a subset of the neighboring nodes to said at least one of multiple nodes; and
   the computer-controlled node determining an optimal cost for said at least one of multiple nodes to be equal to the optimized value of the predetermined cost function,
   wherein said optimal cost is independent of data packet forwarding in the multihop communications network, and
   wherein said optimal cost is dependent of a respective cost for each of said plurality of simultaneously potential next hop nodes.

2. The method according to claim 1, further comprising optimizing said predetermined cost function based at least partly on a cost factor due to said at least one of multiple nodes.

3. The method according to claim 1, further comprising determining a plurality of simultaneously potential next hop nodes and an associated optimal cost node by node until a mesh of simultaneously potential routes is provided from the source node to the destination node.

4. The method according to claim 1, further comprising determining link parameters that together with the plurality of simultaneously potential next hop nodes jointly optimizes a predetermined cost function.

5. The method according to claim 1, further comprising determining the plurality of simultaneously potential next hop nodes for a node i based on optimization of a predetermined cost function $f_i$ according to:

$$\underset{S''_j \in S''}{Optimize} \; f_1\left(Cost_{S''_{j(k)}}, \Delta Cost_{i, S''_{j(k)}} \; \middle| \; \forall \, S''_{j(k)} \in S''_j\right) \Rightarrow Cost_i(opt), S''_j(opt)$$

where S" represents all possible next hop nodes for node i, S"$_j$ represents all possible combinations of the nodes in S", $Cost_{S''_{j(k)}}$ is the individual cost of node S"$_{j(k)}$ in one particular set S"$_j$ and $\Delta Cost_{i, S''_{j(k)}}$ is the cost of going from node i to node S"$_{j(k)}$, and $Cost_i$ (opt) is the optimum cost for node i and S"$_j$ (opt) is the set of simultaneously potential next hop nodes.

6. The method according to claim 5, further comprising determining the plurality of simultaneously potential next hop nodes for node i based on optimization of a predetermined cost function according to:

$$\underset{S''_j \in S''}{Optimize} \left(f_1\left(Cost_{S''_{j(k)}}, \Delta Cost_{i, S''_{j(k)}} \; \middle| \; \forall \, S''_{j(k)} \in S''_j\right)\right) \circ Const_i \Rightarrow Cost_i, S''_j(opt),$$

where $\circ$ is an arbitrary arithmetic operation depending on choice and design goal, and $Const_i$ is a term which node i may include in the cost.

7. The method according to claim 6, further comprising determining the plurality of simultaneously potential next hop nodes for a node i based on optimization of a predetermined cost function according to:

$$Cost_i = \underset{S''_j \in S''}{Optimize}$$

$$\left\{\underset{Par}{Optimize}\left\{Cost_{i, S''_j}(Par) \circ f_2\left(Cost_{S''_{j(k)}} \; \middle| \; \forall \, S''_{j(k)} \in S''_j\right)\right\}\right\} \circ Const_i \Rightarrow$$

$$Cost_i(opt), S''_j(opt), Par(opt)$$

where Par is an n-dimensional link parameter space, where n=1,2,..., $Cost_{i, S''_j}(Par)$ represents the cost to send data from node i to a node in the set S"$_j$ as a function of the link parameter space Par and the set of nodes S"$_j$, and Par(opt) is the optimum set of link parameters for forwarding data.

8. The method according to claim 6, further comprising selecting the term $Const_i$ depending on topology connectivity and/or dynamic properties of the network.

9. The method according to claim 6, further comprising selecting the term $Const_i$ depending on stochastic variables.

10. The method according to claim 6, further comprising selecting the term $Const_i$ depending on at least one of interference, battery status at node i and a queuing situation at said node i.

11. The method according to claim 1, further comprising associating the cost for a node with at least one of delay, interference, number of hops and path loss.

12. A system for cost determination independent of data packet forwarding in a multihop communications network including a computer-controlled node comprising:
means for determining a plurality of simultaneously potential next hop nodes for at least one of multiple nodes from a source node to a destination node in the network such that said nodes jointly optimize a predetermined cost function, said plurality of simultaneously potential next hop nodes form a subset of the neighboring nodes to said at least one of multiple nodes; and
means for determining an optimal cost, for said at least one of multiple nodes, to be equal to the optimized value of the predetermined cost function based on a weighted combination of individual costs for each possible next hop node for said at least one of multiple nodes,
wherein said optimal cost is independent of data packet forwarding in the multihop communications network,
wherein said optimal cost dependent of a respective cost for each of said plurality of simultaneously potential next hop nodes.

13. The system according to claim 12, further comprising means for determining a plurality of simultaneously potential next hop nodes and an associated optimal cost, node by node until a mesh of simultaneously potential routes is provided from the source node to the destination node.

14. The system according to claim 12, further comprising:
means for determining link parameters that together with the plurality of simultaneously potential next hop nodes jointly optimize a predetermined cost function.

15. The system according to claim 12, wherein said means for determining an optimal cost is arranged to determine a predetermined cost function $f_1$ according to:

$$\underset{S''_j \in S''}{Optimize} \; f_1\left(Cost_{S''_{j(k)}}, \Delta Cost_{i, S''_{j(k)}} \; \middle| \; \forall \, S''_{j(k)} \in S''_j\right) \Rightarrow Cost_i(opt), S''_j(opt)$$

where S" represents all possible next hop nodes for node i, S"$_j$ represents all possible combinations of the nodes in S", $Cost_{S''_{j(k)}}$ is the individual cost of node S"$_{j(k)}$ in one particular set S"$_j$, and $\Delta Cost_{i, S''_{j(k)}}$ is the cost of going from node i to node S"$_{j(k)}$, and $Cost_i$ (opt) is the optimum cost for node i and S"$_j$ (opt) is the set of simultaneously potential next hop nodes.

16. A node enabling cost determination independent of data packet forwarding in a multihop communications network, comprising:
means for determining a plurality of simultaneously potential next hop nodes for said node, such that said simultaneously potential next hop nodes jointly optimize a predetermined cost function, said plurality of simultaneously potential next hop nodes form a subset of the neighboring nodes to said at least one of multiple nodes; and
means for determining an optimal cost for the node to be equal to the optimized value of the predetermined cost function based on a weighted combination of individual costs for each possible next hop node for said at least one of multiple nodes,
wherein said optimal cost is independent of data packet forwarding in the multihop communications network,
wherein said optimal cost dependent of a respective cost for each of said plurality of simultaneously potential next hop nodes.

* * * * *

UNITED STATES PATENT AND TRADEMARK OFFICE
CERTIFICATE OF CORRECTION

PATENT NO. : 7,729,260 B2
APPLICATION NO. : 10/584131
DATED : June 1, 2010
INVENTOR(S) : Larsson et al.

It is certified that error appears in the above-identified patent and that said Letters Patent is hereby corrected as shown below:

On the Face Page, in Figure, for Tag "S2", in Line 2, delete "sort(cost(m-d)" and insert -- sort(cost(m-d)) --, therefor.

On Page 2, in Field (56), under "OTHER PUBLICATIONS" in Column 2, Line 15, delete "2006-106," and insert -- 2003-106, --, therefor.

In Fig. 7, Sheet 7 of 8, for Tag "S2", in Line 2, delete "sort(cost(m-d)" and insert -- sort(cost(m-d)) --, therefor.

In Column 5, Line 59, delete "Belhnan-Ford" and insert -- Bellman-Ford --, therefor.

In Column 7, Lines 8-9, delete "$\left( \Delta Cost_{S''_{j(k)}} \mid \forall S''_{j(k)} \in S''_j \right) \} \} \circ Const_i$"

and insert -- $\left( Cost_{S''_{j(k)}} \mid \forall S''_{j(k)} \in S''_j \right) \} \} \circ Const_i$ --, therefor.

In Column 7, Line 46, delete "invention" and insert -- invention, --, therefor.

In Column 7, Line 64, delete "dectector" and insert -- detector --, therefor.

Signed and Sealed this
First Day of February, 2011

David J. Kappos
*Director of the United States Patent and Trademark Office*

CERTIFICATE OF CORRECTION (continued)
U.S. Pat. No. 7,729,260 B2

In Column 8, Lines 54-55, delete " $f_1\left(Cost_{S''_{j(k)}}, \Delta Cost_{i,S''_{j(k)}} \mid \forall S''_{j(k)} \in S''_j\right) =$ "

and insert -- $f_1\left(Cost_{S''_{j(k)}}, \Delta Cost_{i,S''_{j(k)}} \mid \forall S''_{j(k)} \in S''_j\right) =$ --, therefor.

In Column 11, Line 49, delete "finction" and insert -- function --, therefor.

In Column 13, Line 8, in Claim 5, delete "f$_i$" and insert -- f$_1$ --, therefor.

In Column 13, Line 18, in Claim 5, delete "S''" and insert -- S''$_j$, --, therefor.